(12) United States Patent
Tagar et al.

(10) Patent No.: US 11,977,734 B2
(45) Date of Patent: May 7, 2024

(54) STORAGE BLOCK BALANCING USING VOLUME PART MIGRATION

(71) Applicant: EMC IP Holding Company LLC, Hopkinton, MA (US)

(72) Inventors: Roi Tagar, Haifa (IL); Evgeny Katz, Haifa (IL); Gil BenZeev, Haifa (IL); Zeev Shusterman, Haifa (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/830,469

(22) Filed: Mar. 26, 2020

(65) Prior Publication Data

US 2021/0303169 A1    Sep. 30, 2021

(51) Int. Cl.
*G06F 3/06* (2006.01)

(52) U.S. Cl.
CPC .......... *G06F 3/0608* (2013.01); *G06F 3/0644* (2013.01); *G06F 3/0647* (2013.01); *G06F 3/067* (2013.01)

(58) Field of Classification Search
CPC ...... G06F 3/0608; G06F 3/0644; G06F 3/067; G06F 3/0647
See application file for complete search history.

(56) References Cited

U.S. PATENT DOCUMENTS

| | | |
|---|---|---|
| 5,551,003 A | 8/1996 | Mattson et al. |
| 5,659,743 A * | 8/1997 | Adams ............... G06F 12/08 711/E12.07 |
| 5,764,880 A | 6/1998 | Gerdt et al. |
| 6,052,799 A | 4/2000 | Li et al. |

(Continued)

FOREIGN PATENT DOCUMENTS

| | | |
|---|---|---|
| WO | PCT/US2019/024885 | 1/2020 |
| WO | PCT/US2019/024900 | 1/2020 |

OTHER PUBLICATIONS

Microsoft Corporation, Microsoft Computer Dictionary, 2002, Microsoft Press, Fifth Edition, p. 366 (Year: 2002).*

(Continued)

*Primary Examiner* — Eric T Loonan
(74) *Attorney, Agent, or Firm* — Ryan, Mason & Lewis, LLP

(57) ABSTRACT

Techniques are provided for implementing storage block balancing using volume part migration. One method comprises obtaining a capacity utilization of storage blocks each storing a portion of one or more storage volumes; and when the capacity utilization of a given storage block is above an upper target threshold, migrating a volume part of the given storage block to a different storage block having a capacity utilization below a lower target threshold, wherein the different storage block is within a same storage pool as the given storage block, and wherein the volume part comprises a subset of a storage volume. A volume part from a first storage block may also (or alternatively) be migrated to a second storage block when: (i) a number of blocks exceed a first threshold; (ii) a plurality of volume parts of the first storage block fit in one or more additional storage blocks in the same storage pool that are below the lower target threshold; and/or (iii) a storage block having a lowest utilization in the storage pool is smaller than a second threshold.

20 Claims, 11 Drawing Sheets

(56) References Cited

U.S. PATENT DOCUMENTS

| | | | |
|---|---|---|---|
| 6,941,420 | B2 | 9/2005 | Butterworth et al. |
| 9,372,751 | B2 | 6/2016 | McNutt |
| 9,514,014 | B2 | 12/2016 | Webman et al. |
| 9,773,026 | B1* | 9/2017 | Tetreault ............... G06F 11/30 |
| 10,083,199 | B1* | 9/2018 | Sharma ............... G06F 16/2343 |
| 10,445,180 | B2 | 10/2019 | Butterworth et al. |
| 10,521,151 | B1* | 12/2019 | Fay ............... G06F 3/061 |
| 2002/0032835 | A1 | 3/2002 | Li et al. |
| 2008/0140672 | A1* | 6/2008 | Tomida ............... G06F 16/119 |
| 2008/0147960 | A1* | 6/2008 | Sugino ............... G06F 3/0605 |
| | | | 711/100 |
| 2008/0184000 | A1* | 7/2008 | Kawaguchi ............... G06F 3/0665 |
| | | | 711/171 |
| 2009/0150639 | A1* | 6/2009 | Ohata ............... G06F 3/067 |
| | | | 711/E12.001 |
| 2010/0030959 | A1* | 2/2010 | Satoyama ............... G06F 11/1435 |
| | | | 711/E12.001 |
| 2011/0066823 | A1* | 3/2011 | Ando ............... G06F 3/0605 |
| | | | 711/171 |
| 2011/0258379 | A1* | 10/2011 | Hayashi ............... G06F 3/0685 |
| | | | 711/E12.001 |
| 2012/0023233 | A1* | 1/2012 | Okamoto ............... G06F 9/45558 |
| | | | 709/226 |
| 2013/0111171 | A1* | 5/2013 | Hirezaki ............... G06F 3/0685 |
| | | | 711/E12.002 |
| 2013/0138908 | A1* | 5/2013 | Iwasaki ............... G06F 3/0607 |
| | | | 711/E12.002 |
| 2014/0195847 | A1* | 7/2014 | Webman ............... G06F 3/067 |
| | | | 714/6.22 |
| 2014/0214771 | A1* | 7/2014 | Ogata ............... G06F 11/1446 |
| | | | 707/649 |
| 2018/0011642 | A1* | 1/2018 | Koseki ............... G06F 11/1076 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

DELL EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 12 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

U.S. Appl. No. 16/343,942 filed in the name of Yonatan Shtarkman et al. on Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. on Apr. 22, 2019, and entitled "Snapshot-Enabled Storage System Implementing Algorithm for Efficient Reading of Data from Stored Snapshots.".

U.S. Appl. No. 16/807,709 filed in the name of Avi Puder et al. on Mar. 3, 2020, and entitled "Management of Shared Resources in a Software-Defined Storage Environment."

U.S. Appl. No. 16/822,818 filed in the name of Itay Keller et al. on Mar. 18, 2020, and entitled "Storage System Implementing Snapshot Longevity Ranking for Efficient Management of Snapshots."

U.S. Appl. No. 16/822,848 filed in the name of Itay Keller et al. on Mar. 18, 2020, and entitled "Assignment of Longevity Ranking Values of Storage Volume Snapshots Based on Snapshot Policies."

U.S. Appl. No. 16/823,813 filed in the name of Itay Keller et al. on Mar. 19, 2020, and entitled "Managing Incompressible Data in a Compression-Enabled Log-Structured Array Storage System."

DELL EMC, "DELL EMC VxRack FLEX," DELL EMC Product Overview, 2018, 5 pages.

https://docs.microsoft.com/en-us/windows-server/storage/storage-spaces/plan-volumes, Jun. 28, 2019.

* cited by examiner

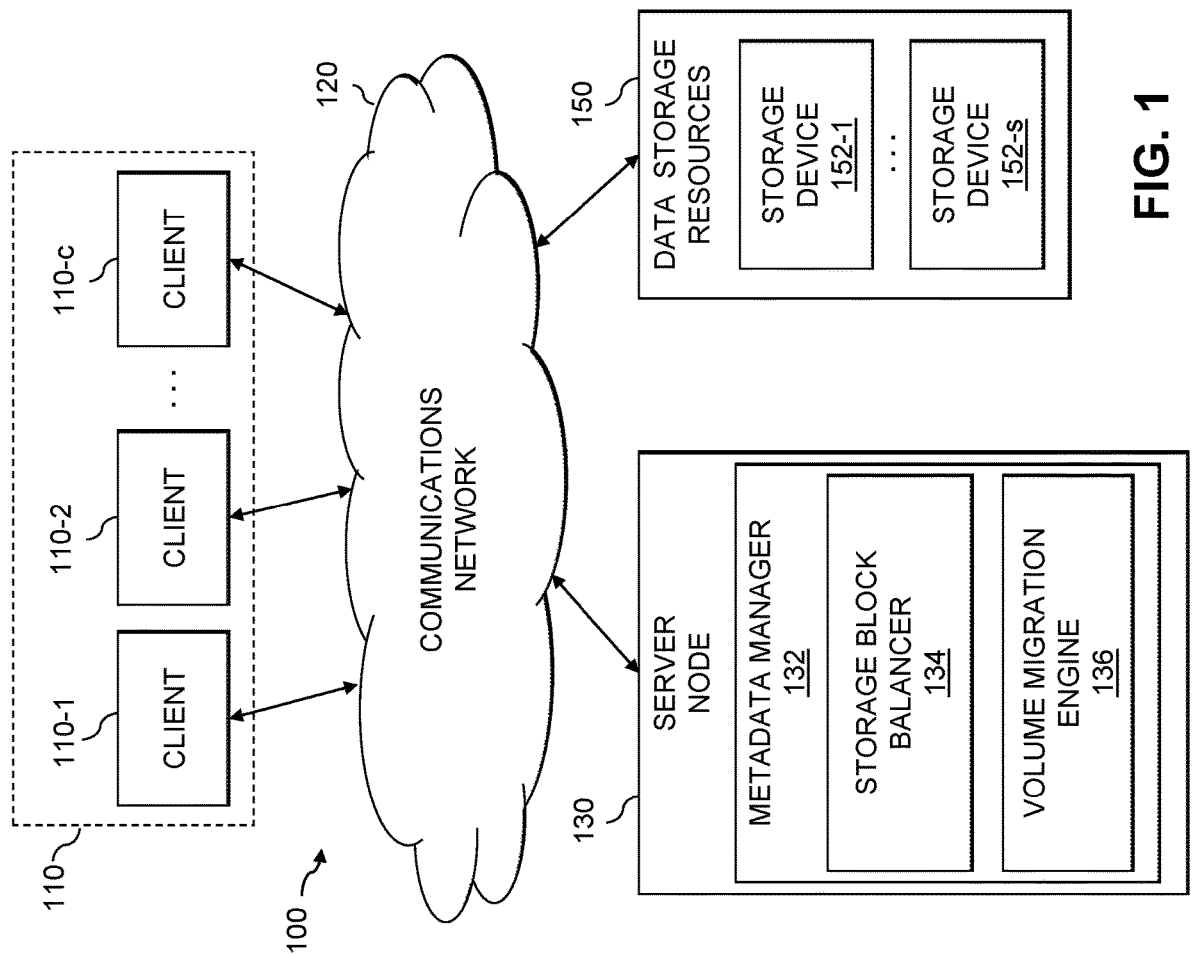

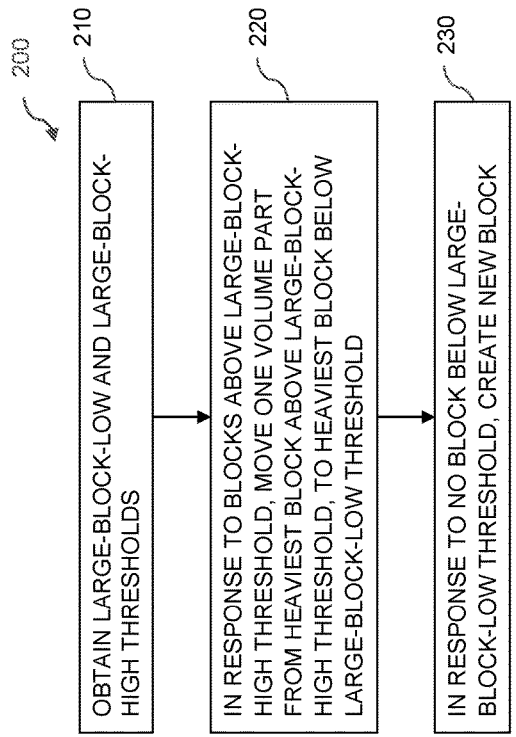

200

210: OBTAIN LARGE-BLOCK-LOW AND LARGE-BLOCK-HIGH THRESHOLDS

220: IN RESPONSE TO BLOCKS ABOVE LARGE-BLOCK-HIGH THRESHOLD, MOVE ONE VOLUME PART FROM HEAVIEST BLOCK ABOVE LARGE-BLOCK-HIGH THRESHOLD, TO HEAVIEST BLOCK BELOW LARGE-BLOCK-LOW THRESHOLD

230: IN RESPONSE TO NO BLOCK BELOW LARGE-BLOCK-LOW THRESHOLD, CREATE NEW BLOCK

FIG. 2

STORAGE BLOCK BALANCING PROCESS 300 FOR SPARSE BLOCKS

OBTAIN THRESHOLDS: SMALL-BLOCK-LOW, SMALL-BLOCK-HIGH.

BLOCK-COUNT-NODE-LOW = MAX-BLOCKS-PER-NODE * 1/4
BLOCK-COUNT-NODE-HIGH = MAX-BLOCKS-PER-NODE * 3/4
BLOCK-NUM = AMOUNT OF BLOCKS IN THE NODE WITH MOST BLOCKS $$\text{small-block-threshold} = \begin{cases} small\_block\_low & block\_num < block\_count\_node\_low \\ Linear \sim block\_num & else \\ small\_block\_high & block\_num > block\_count\_node\_high \end{cases}$$

IN RESPONSE TO: (I) A NUMBER OF BLOCKS EXCEEDING A THRESHOLD; (II) PARTS OF ONE BLOCK FITTING IN OTHER BLOCKS IN THE SAME STORAGE POOL THAT ARE SMALLER THAN LARGE-BLOCK-LOW THRESHOLD, AND (III) LIGHTEST BLOCK (E.G., A BLOCK HAVING A LOWEST UTILIZATION IN THE STORAGE POOL) BEING SMALLER THAN SMALL-BLOCK-THRESHOLD, MOVE ONE VOLUME PART FROM LIGHTEST BLOCK TO HEAVIEST BLOCK BELOW LARGE-BLOCK-LOW THRESHOLD; AND
ITERATE UNTIL LIGHTEST BLOCK IS EMPTY AND CAN BE REMOVED.

FIG. 3

| A1 | A2 | A3 | B1 | C1 | C2 | A4 | A5 |
|---|---|---|---|---|---|---|---|
| A6 | A7 | C3 | C4 | C5 | C6 | B2 | B3 |
| A8 | C7 | | B4 | B5 | B6 | B7 | B8 |
| A9 | B9 | | | | | | |

CAPACITY: 9, 5.2, 5.7, 2.4

500

STORAGE (GB) PER VOLUME PART
|A*|=1.6
|B*|=0.8
|C*|=0.1

FIG. 5

STORAGE (GB) PER VOLUME PART $|A^*|=1.6$
$|B^*|=0.0$
$|C^*|=0.1$

CAPACITY

| A1 | A2 | A3 | | C1 | C2 | A4 | A5 |
|----|----|----|---|----|----|----|----|

8.2

| A6 | A7 | C3 | C4 | C5 | C6 |
|----|----|----|----|----|----|

3.6

| A8 | C7 |
|----|----|

1.7

| A9 |
|----|

STORAGE (GB) PER VOLUME PART $|A^*|=1.6$
$|B^*|=0.0$
$|C^*|=0.1$

| CAPACITY | | | | | | | |
|---|---|---|---|---|---|---|---|
| 8.2 | A1 | A2 | A3 | | C1 | C2 | A4 | A5 |
| 5.2 | A6 | A7 | C3 | C4 | C5 | C6 | A9 |
| 1.7 | A8 | C7 | | | | | |

FIG. 9

VOLUME PART MIGRATION PROCESS 1000

1. ALLOCATE EMPTY VOLUME PART IN MIGRATION DESTINATION

2. COPY CONTENTS OF VOLUME PART FROM SOURCE TO DESTINATION 2.1 SOURCE DATA SERVERS EACH ITERATE OVER THEIR MAPPED PARTS OF VOLUME PART, READING DATA FROM STORAGE DEVICE AND SENDING DATA TO DESTINATION DATA SERVERS 2.2 DESTINATION DATA SERVERS WRITE GIVEN DATA AT STORAGE DEVICE AND OFFSET CORRESPONDING TO OFFSET IN VOLUME PART 2.3 IF ANY NEW WRITE OPERATIONS ARRIVE WHILE COPYING, NEW WRITE OPERATION IS SYNCHRONOUSLY WRITTEN TO BOTH SOURCE AND DESTINATION 2.4 IF THERE IS AN ERROR (E.G., HARDWARE FAILURE, NO MORE SPACE IN DESTINATION, ETC.) MIGRATION OF VOLUME PART IS ABORTED AND SOURCE VOLUME PART IS USED AS BEFORE

3. WHEN DATA COPYING IS COMPLETE, OWNERSHIP OF SERVING USER I/OS MOVES TO DESTINATION GROUP OF DEVICES 3.1 NOTIFY SOURCE SERVERS TO STOP SERVING I/OS 3.2 ENABLE DESTINATION SERVERS TO SERVE I/OS 3.3 CLIENT IS NOTIFIED ABOUT NEW LOCATION OF VOLUME PART 3.4 DELETE SOURCE VOLUME PART 3.5 IF ERROR OCCURS IN STEPS 3.1, 3.2, 3.3 OR 3.4, MOVE FORWARD WITH PROCESS, AS DATA FINISHED MOVING SO ERROR IS HANDLED AS NORMAL ERROR

FIG. 10

STORAGE BLOCK BALANCING USING VOLUME PART MIGRATION

FIELD

The field relates generally to information processing techniques, and more particularly, to techniques for the storage of data.

BACKGROUND

In a storage system, storage blocks store at least a portion of one or more storage volumes. A "volume tree" often refers to a given storage volume and all of the snapshots of the given storage volume. When a volume tree has a high snapshot utilization, the storage blocks comprising portions of the volume tree become very large. Such larger storage blocks may not have enough capacity in a single storage device to rebuild a large storage block. In addition, when a communications failure causes a retransmission of an entire large storage block, the amount of repeated work can be high.

A given storage block remains active for as long as the given storage block comprises at least one portion of a volume tree. If some volume trees were removed from a storage system and other volume trees remained in the storage system, the resulting storage blocks may be sparse (e.g., comprising few volume tree portions), up to a point where a processing of the metadata of the sparse storage blocks becomes heavy compared to the actual amount of data stored by the storage blocks. When reducing a storage pool by removing one or more storage volumes and then removing storage nodes, if the number of storage blocks remains high, each storage node is required to handle more storage blocks, which costs the storage node additional processing and memory resources, while handling a similar or lower amount of storage capacity.

A need therefore exists for techniques for balancing storage blocks to address the above-described large block and/or sparse block problems.

SUMMARY

In one embodiment, a method comprises obtaining a capacity utilization of a plurality of storage blocks each storing at least a portion of one or more storage volumes; and in response to the capacity utilization of a given storage block being above an upper target threshold, migrating a volume part of the given storage block from the given storage block to a different storage block having a capacity utilization below a lower target threshold, wherein the different storage block is within a same storage pool as the given storage block, and wherein the volume part comprises a subset of a storage volume.

In some embodiments, a volume part from a first storage block is migrated to a second storage block in response to one or more of: (i) a number of blocks exceeding a first threshold; (ii) a plurality of volume parts of the first storage block fitting in one or more additional storage blocks in the same storage pool that are below the lower target threshold; and (iii) a storage block having a lowest utilization in the storage pool being smaller than a second threshold.

Other illustrative embodiments include, without limitation, apparatus, systems, methods and computer program products comprising processor-readable storage media.

BRIEF DESCRIPTION OF THE DRAWINGS

FIG. 1 is a high-level schematic illustration of a computing system comprising a software-defined storage control system that implements a process for balancing storage blocks using volume part migration, according to an exemplary embodiment of the disclosure;

FIG. 2 is a flow chart illustrating an exemplary implementation of a storage block balancing process for heavy blocks, according to one embodiment of the disclosure;

FIG. 3 illustrates exemplary pseudo code for a storage block balancing process for sparse blocks, according to one embodiment of the disclosure;

FIGS. 5 through 9 illustrate various stages of a storage block balancing for an exemplary storage system comprising three storage volumes and four variable-sized storage blocks, according to one or more embodiments of the disclosure;

FIG. 10 illustrates exemplary pseudo code for a volume part migration process, according to an embodiment;

DETAILED DESCRIPTION

Figure 4:
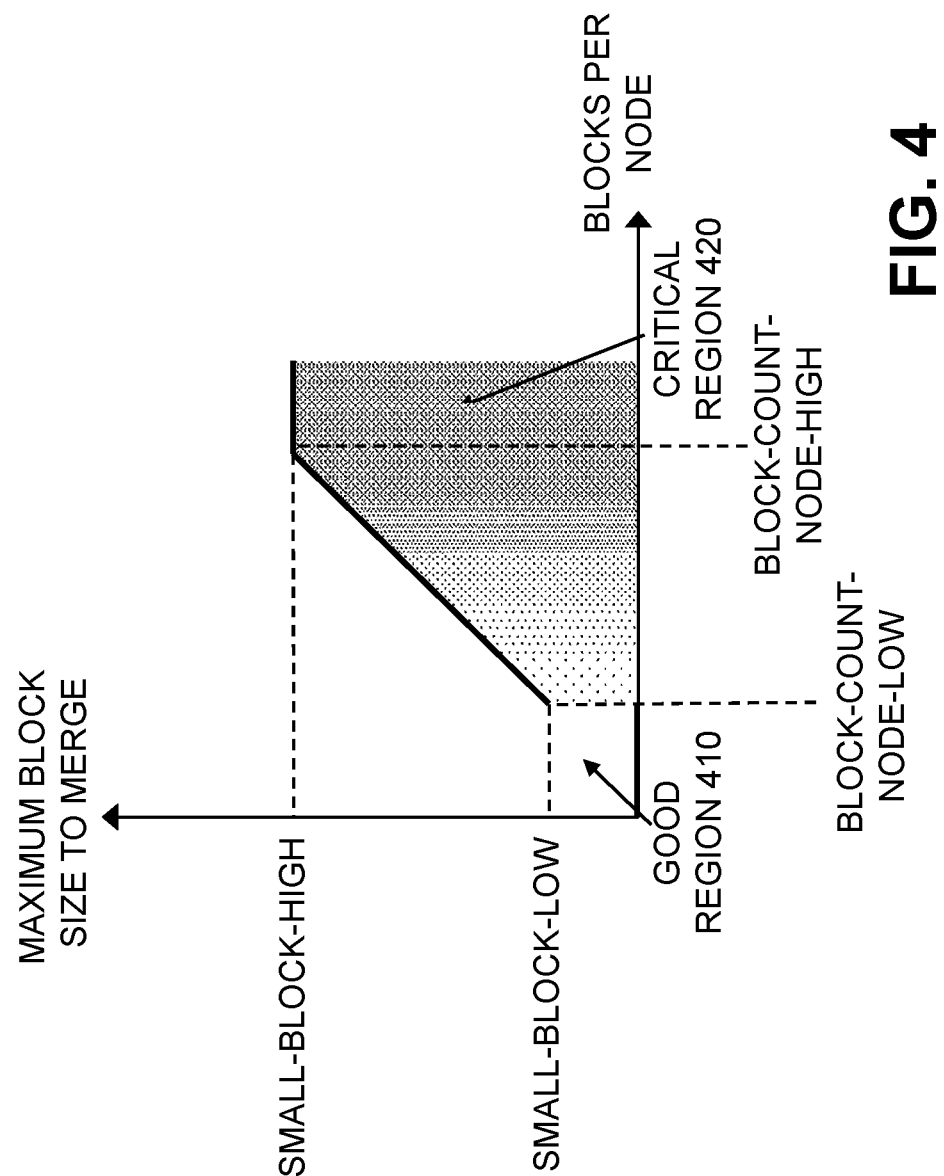
FIG. 4 illustrates the storage block balancing formula of FIG. 3 by indicating a maximum block size to merge as a function of the number of blocks per node, according to some embodiments.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for implementing storage block balancing using volume part migration.

As noted above, in a storage system, storage blocks store at least a portion of one or more storage volumes. The term "storage block" as used herein is intended to be broadly construed, so as to encompass, for example, any storage element comprising a portion of one or more storage volumes. In one or more embodiments, storage blocks are balanced to address the heavy (or large) block problem described above by migrating, in response to a capacity utilization of a given storage block being above an upper target threshold, a volume part of the given storage block from the given storage block to a different storage block below a lower target threshold, where the different storage block is within a same storage pool as the given storage block, and where the volume part comprises a subset of a storage volume.

In some embodiments, storage blocks are balanced to address the sparse (or small) block problem described above by migrating a volume part from a first storage block to a second storage block in response to: (i) a number of blocks exceeding a first threshold; (ii) a plurality of volume parts of the first storage block fitting in one or more additional storage blocks in the same storage pool that are below the lower target threshold; and/or (iii) a storage block having a lowest utilization in the storage pool being smaller than a second threshold (e.g., a small block threshold).

FIG. 1 is a high-level schematic illustration of a computing system comprising a software-defined storage system that implements a process for balancing storage blocks using volume part migration, according to an exemplary embodiment of the disclosure. More specifically, FIG. 1 schematically illustrates a computing system 100 which comprises a plurality of client applications 110-1, 110-2, . . . , 110-*c* (collectively referred to as client applications 110), a communications network 120, one or more server nodes 130 and data storage resources 150. One or more server nodes 130 may comprise a software-defined storage (SDS) control system (not shown in FIG. 1). The data storage resources 150 comprise a plurality of storage devices 152-1 through 152-*s* (collectively referred to as storage devices 152).

The client applications 110 include various types of applications that issue data I/O requests to storage volumes. For example, the client applications 110 include user applications, server applications, database applications, virtual machines and containers. The client applications 110 can be hosted by, and execute on, various types of computing devices and systems including, but not limited to, desktop computers, laptop computers, workstations, computer servers, enterprise servers, rack servers, smart phones and electronic tablets.

While the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. The term "network" as used herein is therefore intended to be broadly construed so as to encompass a wide variety of different network arrangements, including combinations of multiple networks possibly of different types, which enable communication using, e.g., Internet Protocol (IP) or other communication protocols such as Fibre Channel data transfer protocol, and an iSCSI (Internet Small Computer Systems Interface) data transfer protocol, to support storage network connectivity.

In some embodiments, the data storage resources 150 comprise direct-attached storage (DAS) resources (internal and/or external storage resources of the server node 130), wherein the storage devices 152 are virtually pooled into shared block storage by the SDS control system. For example, the storage devices 152 include the same type, or a combination of different types of persistent storage devices (e.g., physical block devices) such as hard disk drives (HDDs), solid-state drives (SSDs) (e.g., flash storage devices), PCIe flash cards, or other types and combinations of non-volatile memory. The data storage resources 150 are directly connected to the server node 130 through, e.g., a host bus adapter, and using suitable protocols such as ATA, SATA, eSATA, NVMe, SCSI and SAS. In an exemplary embodiment, the storage devices 152 include both HDD and SSD storage devices. As is known in the art, SSD storage devices provide faster storage performance than HDD devices.

In at least one embodiment, the data storage resources 150 employ a distributed storage system that provides a volume tree migration ability and variable-size storage blocks. As noted above, a volume tree refers to a storage volume and all of the snapshots of the storage volume. A storage block can be migrated between storage nodes belonging to the same storage pool, either for balancing or for rebuilding when a storage node fails.

In one or more embodiments, storage volumes are allocated (and migrated) in portions referred to herein as volume parts. Each volume part represents a continuous part of the address space of a virtual volume. When a volume is allocated, as many volume parts as needed are allocated. Each volume part is spread across a plurality of storage devices for load balancing. The storage block contains up to a limited amount of portions of one or more volume trees, but for each such portion, the storage block contains the entire volume tree (including all snapshots of that offset). Thus, a storage block can comprise a limited amount of volume parts.

While FIG. 1 generally depicts the software-defined storage environment having a single server node 130, it is to be understood that in other embodiments, the system 100 of FIG. 1 can implement a server cluster of two or more server nodes 130 (e.g., hundreds of server nodes), wherein each server node 130 deploys its own SDS control system. In this instance, the SDS control system of each server node converts the local storage resources (e.g., DAS resources) of the server node into block storage and contributes the block storage to the server cluster to implement a server-based storage area network (SAN) (e.g., virtual SAN), wherein each server node is part of a loosely coupled server cluster which enables "scale-out" of the software-defined storage environment.

In the software-defined storage environment of FIG. 1, for purposes of discussion, the term "node" or "server node" as used herein refers to a single server node (e.g., one server node 130) which comprises physical block devices (e.g., HDD devices and SSD devices). The SDS control system exposes abstractions of block devices (e.g., virtual block devices). For example, a virtual block device can correspond to a volume of a storage pool. Each virtual block device spans across any number of actual physical storage devices, which are referred to herein as "storage pools." For illustrative purposes, it is assumed that each "storage pool" is homogenous in terms of the type of storage devices within the group (e.g., a storage pool can include only HDD devices or SSD devices). In addition, different storage pools can have the same type of storage device, but a different number of storage devices. For example, a first storage pool can include 10 HDDs, a second storage pool can include 100 HDDs, a third storage pool can include 50 SSDs, and a fourth group can include 100 SSDs.

In general, a software-defined storage system has certain characteristics which provide the impetus for implementing the balancing of storage blocks using volume part migration in accordance with the present disclosure, the functions of which will be explained in further detail below. It is noted that conventional approaches (i) migrate a whole storage block as one piece within the same storage pool, or (ii) migrate parts of a storage volume to storage blocks of a different storage pool (e.g., a collection of storage devices).

The SDS control system is a component of the software-defined storage environment shown in FIG. 1. In some embodiments, the software-defined storage environment comprises other components such as SDS data clients, which are not specifically shown in FIG. 1. The SDS control system comprises a software layer that is deployed on one or more server nodes 130 and configured to provision, orchestrate and manage the physical data storage resources 150. For example, the SDS control system implements methods that are configured to create and manage storage pools by aggregating capacity from the physical storage devices 152 (e.g., virtual pools of block storage).

The SDS control system supports the virtualization of storage by separating the control and management software from the hardware architecture. The SDS control system is configured to abstract storage access services from the underlying storage hardware to thereby control and manage I/O requests issued by the client applications 110, as well as to support networking and connectivity. As shown in FIG. 1, the SDS control system is deployed in the data path between the client applications 110 and the physical data storage resources 150, and is configured to respond to data I/O requests from the client applications 110 by accessing the data storage resources 150 to store/retrieve data to/from the storage devices 152 based on the I/O requests.

On the client-side, an SDS data client (SDC) is deployed in each host application server which hosts one or more of the client applications 110 that require access to the block devices exposed and managed by the SDS control system. The SDC exposes block devices representing the virtual storage volumes that are currently mapped to that host. In particular, the SDC serves as a block driver for a client (server) to access the block storage that is managed by the SDS control system. The SDC provides the operating system or hypervisor (which runs the SDC) access to the logical block devices (e.g., volumes). The SDCs have knowledge of which SDS control systems (e.g., SDS control system) hold its block data, so multipathing can be accomplished natively through the SDCs. The metadata managers manage SDC to SDS control system data mappings.

Generally, the metadata manager 132 manages the computing system 100. The metadata manager 132 comprises the metadata required for system operation, such as configuration changes. In one or more embodiments, the metadata manager 132 manages the metadata, the SDCs, SDS, device mappings, volumes, snapshots, system capacity (e.g., device allocations and/or release of capacity), RAID protection, errors and failures, and/or system rebuild tasks (including rebalancing). In addition, user interactions with the computing system 100 are handled by the metadata manager 132 in some embodiments. In a normal input/output (I/O) flow, for example, the metadata manager 132 is not part of the data path and user data does not pass through the metadata manager 132. Therefore, the metadata manager 132 is not a performance bottleneck for IO operations.

The exemplary metadata manager 132 also comprises a storage block balancer 134 and a volume migration engine 136. In some embodiments, the exemplary storage block balancer 134 implements a process in accordance with FIGS. 2 and/or 3 and the exemplary volume migration engine 136 implements a process in accordance with FIG. 10.

It is to be appreciated that this particular arrangement of modules 134, 136 illustrated in the metadata manager 132 of the FIG. 1 embodiment is presented by way of example only, and alternative arrangements can be used in other embodiments. For example, the functionality associated with modules 134, 136 in other embodiments can be combined into a single module, or separated across a larger number of modules. As another example, multiple distinct processors can be used to implement different ones of modules 134, 136 or portions thereof.

At least portions of modules 134, 136 may be implemented at least in part in the form of software that is stored in memory and executed by a processor.

It is to be understood that the particular set of elements shown in FIG. 1 for balancing storage blocks using volume part migration is presented by way of illustrative example only, and in other embodiments additional or alternative elements may be used. Thus, another embodiment includes additional or alternative systems, devices and other network entities, as well as different arrangements of modules and other components.

As noted above, computing system 100 comprises a software-defined storage system that implements the disclosed techniques for balancing storage blocks using volume part migration. In one exemplary implementation, the software-defined storage system may be implemented using the Dell EMC ScaleIO® software-defined storage product, commercially available from Dell EMC of Hopkinton, MA. The Dell EMC ScaleIO™ software-defined storage product is also known as the VxFlex OS® software-defined storage product.

One or more embodiments of the disclosure provide solutions for heavy and sparse problems described above. FIG. 2 is a flow chart illustrating an exemplary implementation of a storage block balancing process 200 for heavy blocks, according to one embodiment of the disclosure. As shown in FIG. 2, the exemplary storage block balancing process 200 for heavy blocks initially obtains a large-block-low threshold and a large-block-high threshold during step 210.

During step 220, the exemplary storage block balancing process 200 for heavy blocks moves one volume part from a heaviest block above the large-block-high threshold, to a heaviest block below the large-block-low threshold, in response to blocks being above the large-block-high threshold. In addition, in response to no block being below the large-block-low threshold, the exemplary storage block balancing process 200 for heavy blocks creates a new block during step 230.

FIG. 3 illustrates exemplary pseudo code for a storage block balancing process 300 for sparse blocks, according to one embodiment of the disclosure. As shown in FIG. 3, the exemplary storage block balancing process 300 for sparse blocks initially obtains small-block-low and small-block-high thresholds, and then sets the following values:

block-count-node-low=max-blocks-per-node*¼;
block-count-node-high=max-blocks-per-node*¾; and
block-num=amount of blocks in the node with most blocks.

Then, the exemplary storage block balancing process 300 for sparse blocks evaluates the following formula using the above values:

$$\text{small-block-threshold} = \begin{cases} \text{small\_block\_low} & \text{block\_num} < \text{block\_count\_node\_low} \\ \text{Linear} \sim \text{block\_num} & \text{else} \\ \text{small\_block\_high} & \text{block\_num} > \text{block\_count\_node\_high} \end{cases}$$

One volume part is then moved by the exemplary storage block balancing process 300 for sparse blocks from a lightest block to a heaviest block below the large-block-low threshold, in response to: (i) a number of blocks exceeding a first threshold; (ii) a plurality of parts (e.g., all parts) of one block fitting in other blocks in the same storage pool that are smaller than large-block-low threshold, and (iii) lightest block (e.g., a storage block having a lowest utilization in the storage pool) being smaller than a small-block-threshold (sometimes referred to as a second threshold). Finally, the exemplary storage block balancing process 300 for sparse blocks iterates until the lightest block is empty and can be removed.

While the exemplary storage block balancing process 200 for heavy blocks and the storage block balancing process 300 for sparse blocks are shown in FIGS. 2 and 3 as separate processes, these processes can be implemented in a single process, as would be apparent to a person of ordinary skill in the art. When the exemplary storage block balancing process 200 for heavy blocks and the storage block balancing process 300 for sparse blocks are implemented as separate processes, the ranges should not overlap to avoid an infinite continual switch between the two processes.

FIG. 4 illustrates the storage block balancing formula of FIG. 3 by indicating a maximum block size to merge as a function of the number of blocks per node, according to some embodiments. The small-block-low and small-block-high thresholds of FIG. 3 are indicated on the y-axis of FIG. 4 and the block-count-node-low and block-count-node-high values indicated on the x-axis of FIG. 4. In addition, FIG. 4 indicates a linear region between a good region 410 (where no changes are needed) and a critical region 420 where storage block balancing is required.

FIGS. 5 through 9 illustrate various stages of a storage block balancing 500, 600, 700, 800, 900 for an exemplary storage system comprising three storage volumes A, B and C, and four variable-sized storage blocks, according to one or more embodiments of the disclosure. In FIGS. 5 through 9, each row corresponds to a different storage block and comprises up to eight exemplary volume parts per storage block. In the examples of FIGS. 5 through 9, each volume part covers 1 GB of address space (for each volume part, the block contains the entire volume tree (e.g., the volume part (at a given offset) and all of its snapshots). A volume tree thus refers to a volume part (at a given offset) and all of its snapshots. The target block size is equivalent to the maximum address space (e.g., large-block-low=8 GB). In addition, assume a uniform utilization across parts of the same storage volume.

As shown in FIG. 5, storage volume A has 1.6 GB per volume part, storage volume B has 0.8 GB per volume part, and storage volume C has 0.1 GB per volume part. The fourth storage block (corresponding to the fourth row of FIG. 5) is sparse (comprising volume parts A9 and B9), but there are not enough slots in the other storage blocks for all of the volume parts that are currently in fourth storage block. As also shown in FIG. 5, the effective capacity of the first storage block is initially 9 (e.g., exceeding the target block size of 8 GB), the second storage block is 5.2, the third storage block is 5.7 and the fourth storage block is 2.4.

In the example of FIG. 6, volume B is deleted, and the weight of storage volume B goes to 0.0 GB per volume part. Note that as a result of deleting volume B, the effective capacity of the first storage block drops to 8.2 (e.g., still exceeding the target block size of 8 GB), the second storage block goes to 3.6, the third storage block goes to 1.7 and the fourth storage block goes to 1.6.

Figure 7:
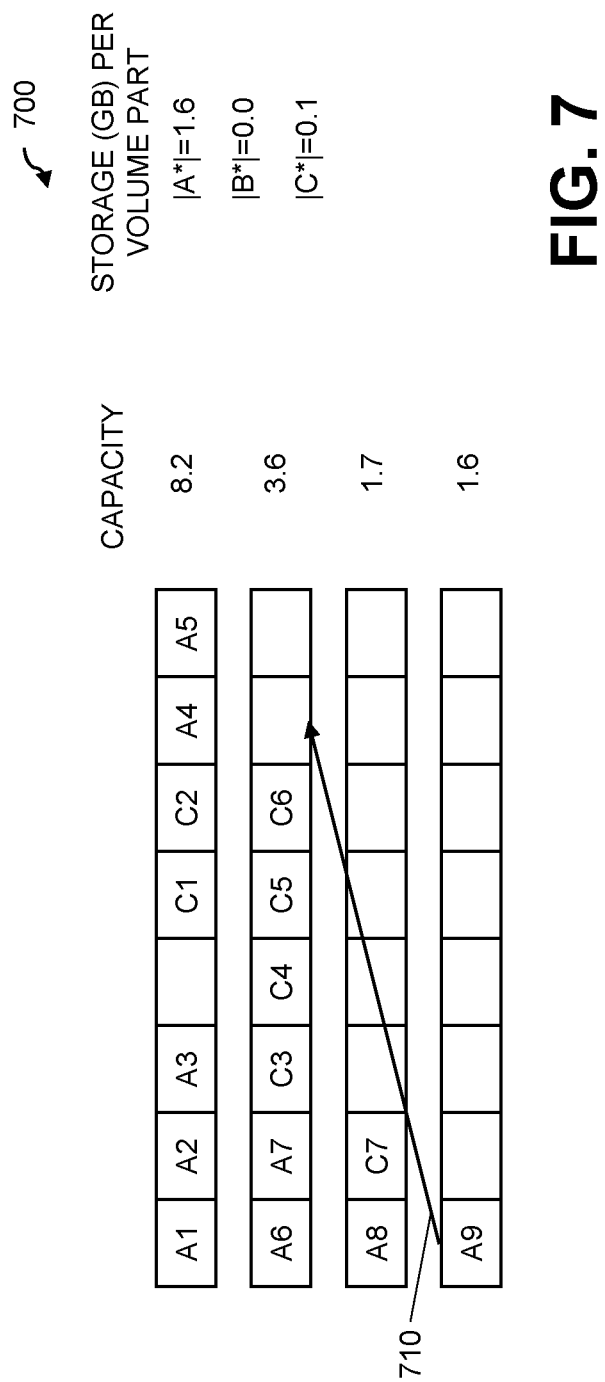

In the example of FIG. 7, the fourth block is the lightest storage block. The disclosed storage block balancing techniques in some embodiments aim to move all volume parts out of the fourth (lightest) storage block. The first storage block (e.g., first row in FIG. 7) is the heaviest storage block and has a free slot, but the first storage block is larger than the target size. The second storage block (e.g., second row in FIG. 7) is the heaviest storage block below the target size and has two free slots. Thus, the second storage block is selected as the destination for the storage block balancing and volume part A9 is selected to move from the fourth storage block to the second storage block, as shown by arrow 710.

Figure 8:
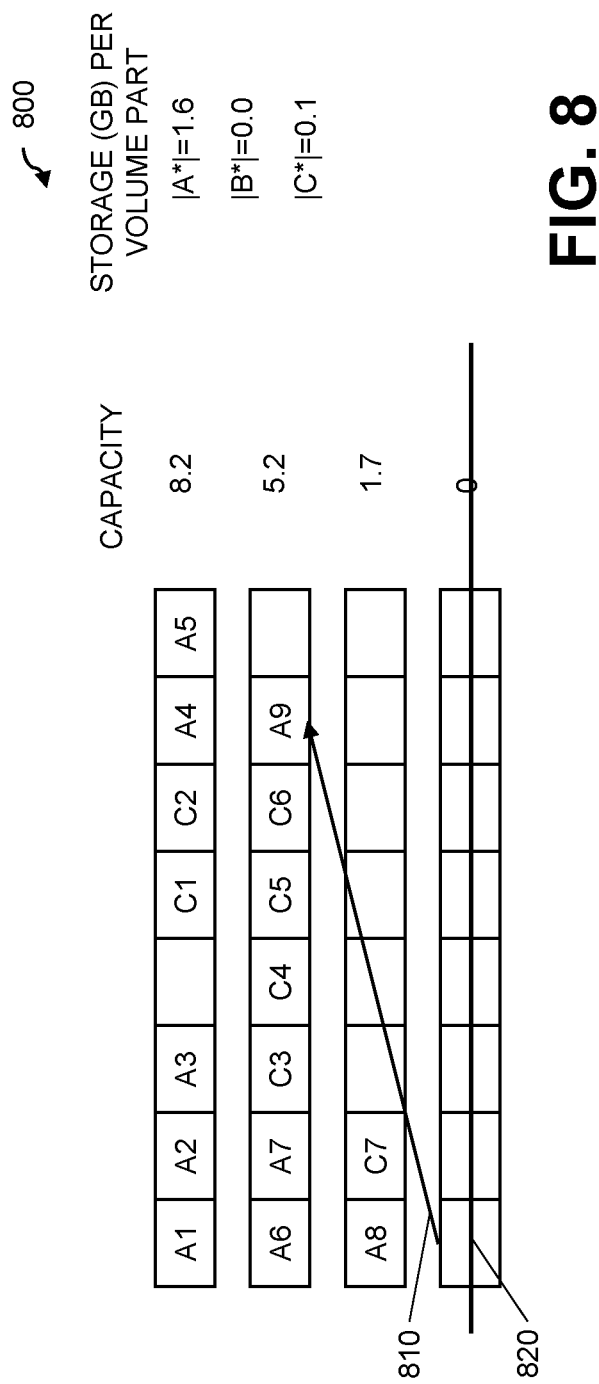

In the example of FIG. 8, volume part A9 has been migrated from the fourth storage block to the second storage block, as shown by arrow 810 (with the capacity increasing to 5.2), and the fourth storage block can be reclaimed, as represented by the solid line 820.

In the example of FIG. 9, volume part A9 was already migrated to the second storage block, and the fourth storage block was reclaimed, as represented by the absence of the fourth storage block in FIG. 9.

FIG. 10 illustrates exemplary pseudo code for a volume part migration process 1000, according to one embodiment of the disclosure. As shown in FIG. 10, the exemplary volume part migration process 1000 comprises the following steps:
1. allocate empty volume part in migration destination;
2. copy contents of volume part from source to destination;
  2.1 source data servers each iterate over their mapped parts of volume part, reading data from storage device and sending data to destination data servers;
  2.2 destination data servers write given data at storage device and offset corresponding to offset in volume part;
  2.3 if any new write operations arrive while copying, new write operation is synchronously written to both source and destination;
  2.4 if there is an error (e.g., hardware failure, no more space in destination, etc.) migration of volume part is aborted and source volume part is used as before;
3. when data copying is complete, ownership of serving user I/Os moves to destination group of devices;
  3.1 notify source servers to stop serving I/Os;
  3.2 enable destination servers to serve I/Os;
  3.3 client is notified about new location of volume part; and
  3.4 delete source volume part; and
  3.5 if error occurs in steps 3.1, 3.2, 3.3 or 3.4, Move forward with process, as data finished moving so error is handled as normal error.

Figure 11:
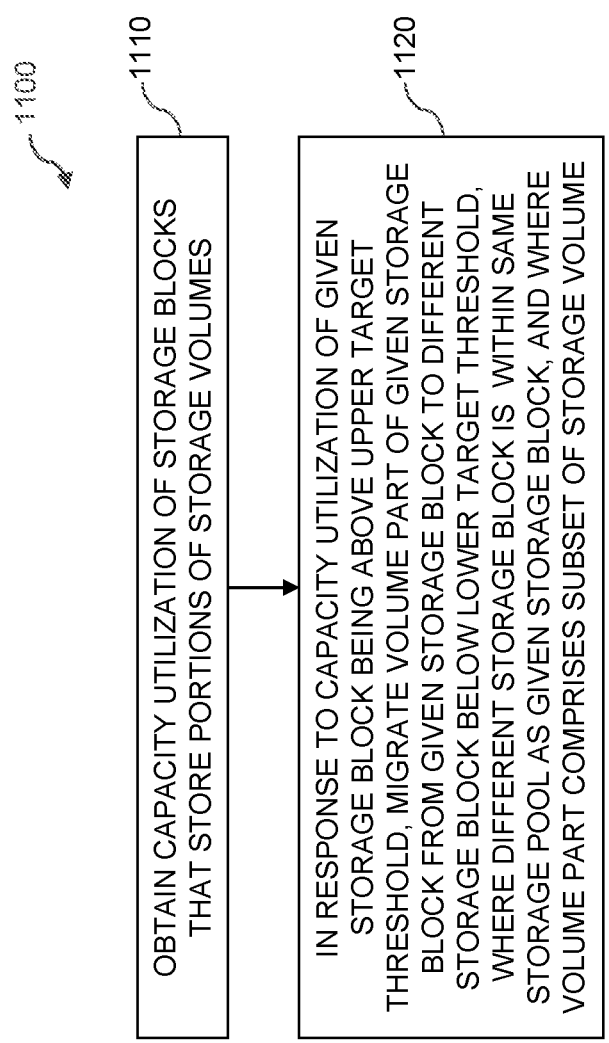
FIG. 11 is a flow chart illustrating an exemplary implementation of a storage block balancing process, according to some embodiments of the disclosure.

FIG. 11 is a flow chart illustrating an exemplary implementation of a storage block balancing process 1100, according to some embodiments of the disclosure. As shown in FIG. 11, the exemplary storage block balancing process 1100 initially obtains a capacity utilization during step 1110 of a plurality of storage blocks each storing at least a portion of one or more storage volumes. During step 1120, the exemplary storage block balancing process 1100 migrates a volume part of the given storage block from the given storage block to a different storage block below a lower target threshold, in response to the capacity utilization of a given storage block being above an upper target threshold, where the different storage block is within a same storage pool as the given storage block, and where the volume part comprises a subset of a storage volume. The migration can be performed, for example, by the exemplary volume part migration process 1000 of FIG. 10.

In addition, in some embodiments, a volume part is migrated from a first storage block to a second storage block in response to one or more of: (i) a number of blocks exceeding a first threshold; (ii) a plurality of volume parts of the first storage block fitting in one or more additional storage blocks in the same storage pool that are below the lower target threshold; and (iii) a storage block having a lowest utilization in the storage pool being smaller than a second threshold (e.g., a small block threshold).

The particular processing operations and other network functionality described in conjunction with the flow diagrams of FIGS. 2, 3, 10 and 11 are presented by way of illustrative example only, and should not be construed as limiting the scope of the disclosure in any way. Alternative embodiments can use other types of processing operations to implement storage block balancing using the disclosed techniques. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In one or more embodiments, the disclosed storage block balancing techniques employ a volume tree migration to move a portion of a storage volume from one storage block to another storage block, when both storage blocks reside in the same storage pool, in order to control and balance storage block sizes (e.g., to address one or more of the large block problem and the sparse block problem).

Figure 12:
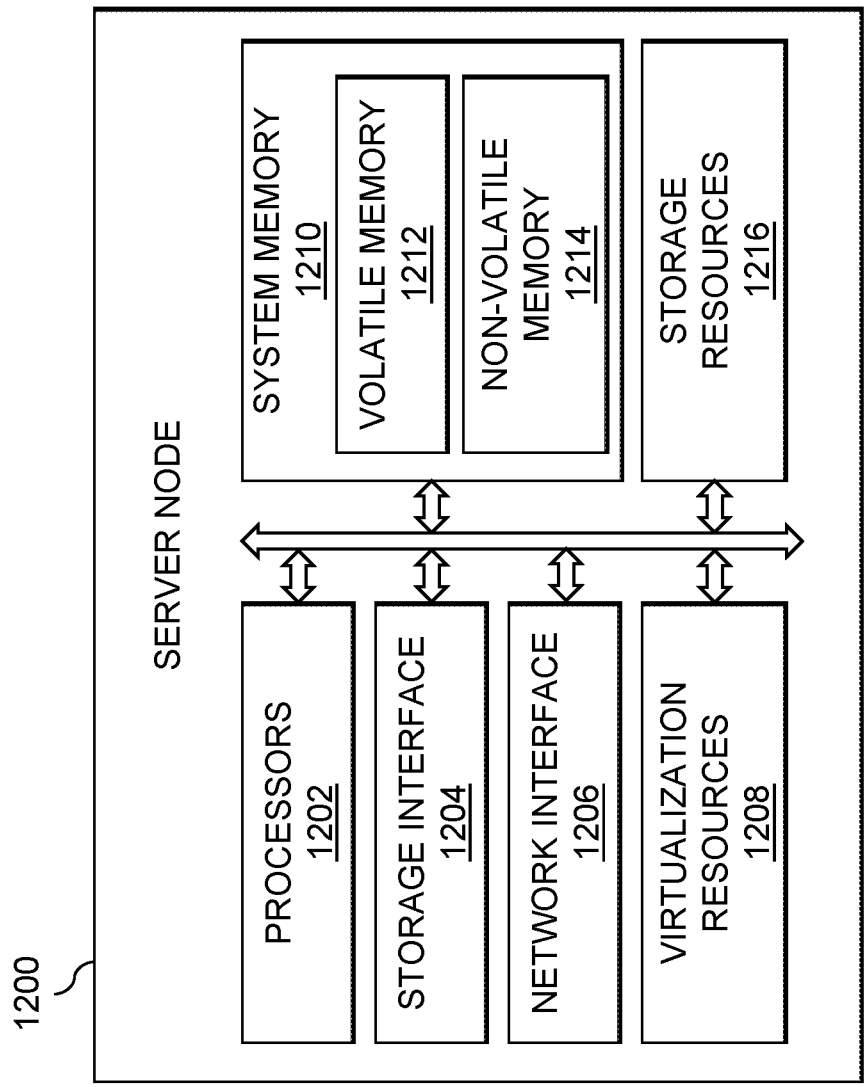
FIG. 12 schematically illustrates framework of a server node which can be implemented in the system of FIG. 1 for hosting a software-defined storage system, according to an exemplary embodiment of the disclosure.

FIG. 12 schematically illustrates a framework of a server node 1200 that can be implemented in the system 100 of FIG. 1 for hosting a software-defined storage control system, according to an exemplary embodiment of the disclosure. In particular, FIG. 12 schematically illustrates an exemplary hardware architecture of the server node 130 of FIG. 1, which can host entities of the SDS control system of FIG. 1. The server node 1200 comprises processors 1202, storage interface circuitry 1204, network interface circuitry 1206, virtualization resources 1208, system memory 1210, and storage resources 1216. The system memory 1210 comprises volatile memory 1212 and non-volatile memory 1214.

The processors 1202 comprise one or more types of hardware processors that are configured to process program instructions and data to execute a native operating system (OS) and applications that run on the server node 1200. For example, the processors 1202 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware and/or firmware. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions.

The storage interface circuitry 1204 enables the processors 1202 to interface and communicate with the system memory 1210, the storage resources 1216, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), and Fibre Channel. The network interface circuitry 1206 enables the server node 1200 to interface and communicate with a network and other system components. The network interface circuitry 1206 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, and converged Ethernet adaptors) to support communication protocols and interfaces including, but not limited to, PCIe, DMA and RDMA data transfer protocols.

The virtualization resources 1208 can be instantiated to execute one or more services or functions which are hosted by the server node 1200. For example, the virtualization resources 1208 can be configured to implement the various modules and functionalities of the SDS control systems of FIG. 1, as discussed herein. In one embodiment, the virtualization resources 1208 comprise virtual machines that are implemented using a hypervisor platform which executes on the server node 1200, wherein one or more virtual machines can be instantiated to execute functions of the server node 1200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 1200, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 1208 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 1200 as well as execute one or more of the various modules and functionalities of the SDS control systems of FIG. 1, as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various software modules of the SDS control systems and the storage block balancing modules that employ volume part migration comprise program code that is loaded into the system memory 1210 (e.g., volatile memory 1212), and executed by the processors 1202 to perform respective functions as described herein. In this regard, the system memory 1210, the storage resources 1216, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 1210 comprises various types of memory such as volatile RAM, NVRAM, or other types of memory, in any combination. The volatile memory 1212 may be a dynamic random-access memory (DRAM) (e.g., DRAM DIMM (Dual In-line Memory Module), or other forms of volatile RAM. The non-volatile memory 1214 may comprise one or more of a NAND Flash storage device, an SSD device, or other types of next generation non-volatile memory (NGNVM) devices. The system memory 1210 can be implemented using a hierarchical memory tier structure wherein the volatile memory 1212 is configured as the highest-level memory tier, and the non-volatile memory 1214 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 1202 to execute a native operating system and one or more applications or processes hosted by the server node 1200, and to temporarily store data that is utilized and/or generated by the native OS and application programs and processes running on the server node 1200. The storage resources 1216 can include, for example, one or more HDDs and/or SSD storage devices.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
obtaining, by at least one entity of a metadata manager on at least one server node of a storage system, a capacity utilization of a plurality of storage blocks each storing at least a portion of one or more storage volumes, wherein the capacity utilization of a given storage block of the plurality of storage blocks is based at least in part on an amount of storage of the given storage block that is storing the at least the portion of the one or more storage volumes stored by the given storage block and corresponding snapshots of the at least the portion of the one or more storage volumes stored by the given storage block, wherein the storage system further comprises one or more storage nodes separate from the at least one server node, wherein the storage nodes comprise a plurality of storage devices, and wherein the plurality of storage devices comprise the plurality of storage blocks; and in response to the capacity utilization of the given storage block being above an upper target threshold, migrating, by the at least one entity of the metadata manager on the server node, a volume part of the given storage block of at least one storage node to a different storage block of at least one different storage node, wherein the different storage block has a capacity utilization below a lower target threshold and is within a same storage pool as the given storage block, wherein the different storage block is selected based at least in part on an evaluation of a relative capacity utilization among the storage blocks, of the at least one different storage node, that have a capacity utilization that is below the lower target threshold, and wherein the volume part comprises a subset of a storage volume, wherein the at least one entity of the metadata manager is configured to: (i) migrate the volume part of the given storage block to the different storage block within the same storage pool; and (ii) migrate one or more different volume parts to one or more target storage blocks of a different storage pool, wherein the capacity utilization of the given storage block is above the upper target threshold;
wherein the method is performed by at least one processing device comprising a processor coupled to a memory.

2. The method of claim 1, further comprising creating a new storage block in response to no storage block being below the lower target threshold.

3. The method of claim 1, wherein the given storage block has a highest capacity utilization among a plurality of storage blocks.

4. The method of claim 1, wherein the different storage block below the lower target threshold has a highest capacity utilization, among the storage blocks of the at least one different storage node, that is below the lower target threshold.

5. The method of claim 1, further comprising migrating a volume part from a first storage block to a second storage block in response to one or more of: (i) a number of blocks exceeding a first threshold; (ii) a plurality of volume parts of the first storage block fitting in one or more additional storage blocks in the same storage pool that are below the lower target threshold; and (iii) a storage block having a lowest utilization in the storage pool being smaller than a second threshold.

6. The method of claim 1, further comprising migrating a volume part from a first storage block to a second storage block and wherein the first storage block has a lowest capacity utilization among the plurality of storage blocks and wherein the second storage block has a highest capacity utilization among the plurality of storage blocks below the lower target threshold.

7. The method of claim 1, further comprising migrating a volume part from a first storage block to a second storage block in response to a storage block having a lowest utilization in the storage pool being smaller than a second threshold and wherein the second threshold is set to: a first value when a number of blocks in a storage system comprising the plurality of storage blocks is below a third threshold, a second value when the number of blocks is above a fourth threshold, and a third value based on a linear expression when the number of blocks is between the third and fourth thresholds.

8. The method of claim 1, further comprising migrating a volume part from a first storage block to a second storage block and reclaiming the given storage block in response to the given storage block being empty after the migration.

9. An apparatus comprising:
at least one processing device comprising a processor coupled to a memory;
the at least one processing device being configured to implement the following steps:
obtaining, by at least one entity of a metadata manager on at least one server node of a storage system, a capacity utilization of a plurality of storage blocks each storing at least a portion of one or more storage volumes, wherein the capacity utilization of a given storage block of the plurality of storage blocks is based at least in part on an amount of storage of the given storage block that is storing the at least the portion of the one or more storage volumes stored by the given storage block and corresponding snapshots of the at least the portion of the one or more storage volumes stored by the given storage block, wherein the storage system further comprises one or more storage nodes separate from the at least one server node, wherein the storage nodes comprise a plurality of storage devices, and wherein the plurality of storage devices comprise the plurality of storage blocks; and
in response to the capacity utilization of the given storage block being above an upper target threshold, migrating, by the at least one entity of the metadata manager on the server node, a volume part of the given storage block of at least one storage node to a different storage block of at least one different storage node, wherein the different storage block has a capacity utilization below a lower target threshold and is within a same storage pool as the given storage block, wherein the different storage block is selected based at least in part on an evaluation of a relative capacity utilization among the storage blocks, of the at least one different storage node, that have a capacity utilization that is below the lower target threshold, and wherein the volume part comprises a subset of a storage volume, wherein the at least one entity of the metadata manager is configured to: (i) migrate the volume part of the given storage block to the different storage block within the same storage pool; and (ii) migrate one or more different volume parts to one or more target storage blocks of a different storage pool, wherein the capacity utilization of the given storage block is above the upper target threshold.

10. The apparatus of claim 9, further comprising migrating a volume part from a first storage block to a second storage block in response to one or more of: (i) a number of blocks exceeding a first threshold; (ii) a plurality of volume parts of the first storage block fitting in one or more additional storage blocks in the same storage pool that are below the lower target threshold; and (iii) a storage block having a lowest utilization in the storage pool being smaller than a second threshold.

11. The apparatus of claim 9, further comprising migrating a volume part from a first storage block to a second storage block and wherein the first storage block has a lowest capacity utilization among the plurality of storage blocks and wherein the second storage block has a highest capacity utilization among the plurality of storage blocks below the lower target threshold.

12. The apparatus of claim 9, further comprising migrating a volume part from a first storage block to a second storage block in response to a storage block having a lowest utilization in the storage pool being smaller than a second threshold and wherein the second threshold is set to: a first value when a number of blocks in a storage system comprising the plurality of storage blocks is below a third threshold, a second value when the number of blocks is above a fourth threshold, and a third value based on a linear expression when the number of blocks is between the third and fourth thresholds.

13. The apparatus of claim 9, further comprising migrating a volume part from a first storage block to a second storage block and reclaiming the given storage block in response to the given storage block being empty after the migration.

14. The apparatus of claim 9, further comprising creating a new storage block in response to no storage block being below the lower target threshold.

15. The apparatus of claim 9, wherein the given storage block has a highest capacity utilization among a plurality of storage blocks.

16. The apparatus of claim 9, wherein the different storage block below the lower target threshold has a highest capacity utilization, among the storage blocks of the at least one different storage node, that is below the lower target threshold.

17. A non-transitory processor-readable storage medium having stored therein program code of one or more software programs, wherein the program code when executed by at least one processing device causes the at least one processing device to perform the following steps:
obtaining, by at least one entity of a metadata manager on at least one server node of a storage system, a capacity utilization of a plurality of storage blocks each storing at least a portion of one or more storage volumes, wherein the capacity utilization of a given storage block of the plurality of storage blocks is based at least in part on an amount of storage of the given storage block that is storing the at least the portion of the one or more storage volumes stored by the given storage block and corresponding snapshots of the at least the portion of the one or more storage volumes stored by the given storage block, wherein the storage system further comprises one or more storage nodes separate from the at least one server node, wherein the storage nodes comprise a plurality of storage devices, and wherein the plurality of storage devices comprise the plurality of storage blocks; and
in response to the capacity utilization of the given storage block being above an upper target threshold, migrating, by the at least one entity of the metadata manager on the server node, a volume part of the given storage block of at least one storage node to a different storage block of at least one different storage node, wherein the different storage block has a capacity utilization below a lower target threshold and is within a same storage pool as the given storage block, wherein the different storage block is selected based at least in part on an evaluation of a relative capacity utilization among the storage blocks, of the at least one different storage node, that have a capacity utilization that is below the lower target threshold, and wherein the volume part comprises a subset of a storage volume, wherein the at least one entity of the metadata manager is configured to: (i) migrate the volume part of the given storage block to the different storage block within the same storage pool; and (ii) migrate one or more different volume parts to one or more target storage blocks of a different storage pool, wherein the capacity utilization of the given storage block is above the upper target threshold.

18. The non-transitory processor-readable storage medium of claim 17, further comprising migrating a volume part from a first storage block to a second storage block in response to one or more of: (i) a number of blocks exceeding a first threshold; (ii) a plurality of volume parts of the first storage block fitting in one or more additional storage blocks in the same storage pool that are below the lower target threshold; and (iii) a storage block having a lowest utilization in the storage pool being smaller than a second threshold.

19. The non-transitory processor-readable storage medium of claim 17, further comprising migrating a volume part from a first storage block to a second storage block in response to a storage block having a lowest utilization in the storage pool being smaller than a second threshold and wherein the second threshold is set to: a first value when a number of blocks in a storage system comprising the plurality of storage blocks is below a third threshold, a second value when the number of blocks is above a fourth threshold, and a third value based on a linear expression when the number of blocks is between the third and fourth thresholds.

20. The non-transitory processor-readable storage medium of claim 17, further comprising migrating a volume part from a first storage block to a second storage block and reclaiming the given storage block in response to the given storage block being empty after the migration.

\* \* \* \* \*